United States Patent
Wakumoto et al.

(10) Patent No.: US 8,510,833 B2
(45) Date of Patent: Aug. 13, 2013

(54) CONNECTION-RATE FILTERING USING ARP REQUESTS

(75) Inventors: Shaun K. Wakumoto, Roseville, CA (US); Frank A. Reichstein, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1201 days.

(21) Appl. No.: 11/260,130

(22) Filed: Oct. 27, 2005

(65) Prior Publication Data

US 2007/0101429 A1    May 3, 2007

(51) Int. Cl.
*G06F 11/00* (2006.01)
*G06F 15/16* (2006.01)

(52) U.S. Cl.
USPC .......... 726/23; 726/1; 726/3; 726/11; 726/12; 726/13; 726/22; 726/29; 726/30; 713/153; 713/154; 713/161

(58) Field of Classification Search
USPC .................. 726/23, 11, 13; 713/154, 153
See application file for complete search history.

(56) References Cited

U.S. PATENT DOCUMENTS

| | | | |
|---|---|---|---|
| 5,539,747 A * | 7/1996 | Ito et al. | 370/235 |
| 6,587,432 B1 * | 7/2003 | Putzolu et al. | 370/229 |
| 7,159,149 B2 * | 1/2007 | Spiegel et al. | 714/43 |
| 7,334,045 B1 * | 2/2008 | Jacobson et al. | 709/238 |
| 7,457,965 B2 * | 11/2008 | Tamura et al. | 713/182 |
| 7,562,390 B1 * | 7/2009 | Kwan | 726/23 |
| 2002/0101819 A1 * | 8/2002 | Goldstone | 370/229 |
| 2002/0174221 A1 * | 11/2002 | Maxwell et al. | 709/224 |
| 2003/0009699 A1 * | 1/2003 | Gupta et al. | 713/201 |
| 2003/0145232 A1 * | 7/2003 | Poletto et al. | 713/201 |
| 2003/0167342 A1 * | 9/2003 | Munger et al. | 709/238 |
| 2004/0017814 A1 * | 1/2004 | Shimada | 370/395.52 |
| 2004/0103314 A1 * | 5/2004 | Liston | 713/201 |
| 2004/0215976 A1 * | 10/2004 | Jain | 713/201 |
| 2004/0221190 A1 * | 11/2004 | Roletto et al. | 714/4 |
| 2004/0236966 A1 * | 11/2004 | D'Souza et al. | 713/201 |
| 2004/0250123 A1 * | 12/2004 | Robert et al. | 713/201 |
| 2004/0255159 A1 * | 12/2004 | Williamson et al. | 713/201 |
| 2005/0018618 A1 * | 1/2005 | Mualem et al. | 370/252 |
| 2005/0044422 A1 * | 2/2005 | Cantrell et al. | 713/201 |
| 2005/0060426 A1 * | 3/2005 | Samuels et al. | 709/238 |
| 2005/0195840 A1 * | 9/2005 | Krapp et al. | 370/401 |
| 2005/0210533 A1 * | 9/2005 | Copeland et al. | 726/23 |
| 2005/0213504 A1 * | 9/2005 | Enomoto et al. | 370/235 |
| 2005/0257269 A1 * | 11/2005 | Chari et al. | 726/25 |
| 2005/0265233 A1 * | 12/2005 | Johnson et al. | 370/229 |
| 2005/0276230 A1 * | 12/2005 | Akahane et al. | 370/252 |
| 2005/0286430 A1 * | 12/2005 | Koga et al. | 370/241 |
| 2006/0072451 A1 * | 4/2006 | Ross | 370/229 |
| 2006/0077964 A1 * | 4/2006 | Wu et al. | 370/352 |
| 2006/0095968 A1 * | 5/2006 | Portolani et al. | 726/23 |
| 2006/0230456 A1 * | 10/2006 | Nagabhushan et al. | 726/25 |

(Continued)

OTHER PUBLICATIONS

Bartlomieyczyk et al. Sep. 24, 2004, Network Security, Preventing Layer 2 Security Threats, pp. 1-7.*

(Continued)

*Primary Examiner* — Edan Orgad
*Assistant Examiner* — Jenise Jackson (57) ABSTRACT

One embodiment relates to a method of connection-rate filtering by a network device. Address resolution protocol (ARP) request packets received from a sub-network are monitored, and a copy of the received ARP request packets are sent to an agent program. The agent program determines a rate of ARP request packets sent by a host in the sub-network. Other embodiments are also disclosed.

16 Claims, 5 Drawing Sheets

400
Monitoring Connections within Subnet (56) References Cited

U.S. PATENT DOCUMENTS

2006/0250954 A1* 11/2006 Mulrane et al. ............... 370/229
2006/0288411 A1* 12/2006 Garg et al. ...................... 726/22
2007/0041331 A1* 2/2007 Ma et al. ........................ 370/252

OTHER PUBLICATIONS

Matthew M. Williamson, "Throttling Viruses: Restricting Propagation to Defeat Malicious Mobile Code", Jun. 17, 2002, pp. 1-6.

Matthew M. Williamson, "Virus Throttling", Virus Bulletin Ltd., Mar. 2003, pp. 8-11.

Joris De Schutter, et al., "Kalman Filters: A Tutorial", Journal A, vol. 40 (4), Dec. 1999, pp. 52-59.

"Connection-Rate Filtering Based on Virus-Throttling Technology", ProCurve Networking HP Innovation, Jun. 2005.}

* cited by examiner

Monitoring Connections within Subnet

FIG. 5

Monitoring Connections outside the Subnet

CONNECTION-RATE FILTERING USING ARP REQUESTS

BACKGROUND OF THE INVENTION

1. Field of the Invention

The present invention relates generally to computer networking and computer software.

2. Description of the Background Art

Virus throttling or connection-rate filtering is a technique for containing the damage caused by fast-spreading worms and viruses. Rather than attempting to prevent a computing machine from becoming infected, virus throttling inhibits the spreading of the worm or virus from an infected machine. This reduces damage because the worm or virus is able to spread less quickly, and this also reduces the network traffic caused by such worms and viruses.

Virus throttling is based on controlling an infected machine's network behavior, and so does not rely on details of the specific virus. In other words, a virus signature is not needed to implement connection rate filtering. Although virus throttling does not prevent infection in the first place, it helps to contain damage by restricting the spread of the virus. With such throttling, a virus or worm outbreak will grow less rapidly, and the network load will be reduced. Further, by damping down the spread of the virus or worm, the throttling buys time for signature-based solutions to reach machines before the virus or worm.

Virus throttling technology has been implemented in the ProCurve® Switch 5300xl available from the Hewlett Packard Company. In the ProCurve® Switch 5300xl, virus throttling works by intercepting Internet Protocol (IP)-routed connection requests in which the source subnet and the destination subnet are different. When a given host exceeds a certain number of unique routed connections within a specific amount of time, the switch may consider this host to be infected by malicious code (such as a virus or worm) and may take appropriate actions.

It is highly desirable to control the spread of computer viruses and other malicious code. More particularly, it is highly desirable to improve methods and apparatus for virus throttling or connection-rate filtering.

SUMMARY

One embodiment relates to a method of connection-rate filtering by a network device. Address resolution protocol (ARP) request packets received from a sub-network are monitored, and a copy of the received ARP request packets are sent to an agent program. The agent program determines a rate of ARP request packets sent by a host in the sub-network.

Another embodiment relates to a network device configured with connection-rate filtering. The device includes at least a plurality of ports, an agent program, and sampling circuitry. The sampling circuitry is configured to send a copy of ARP request packets received from a subnet to the agent program. The agent program is configured to be executed by a system processor and to determine a rate of ARP request packets broadcast by a host in the sub-network.

Other embodiments are also disclosed.

DETAILED DESCRIPTION

Figure 1:
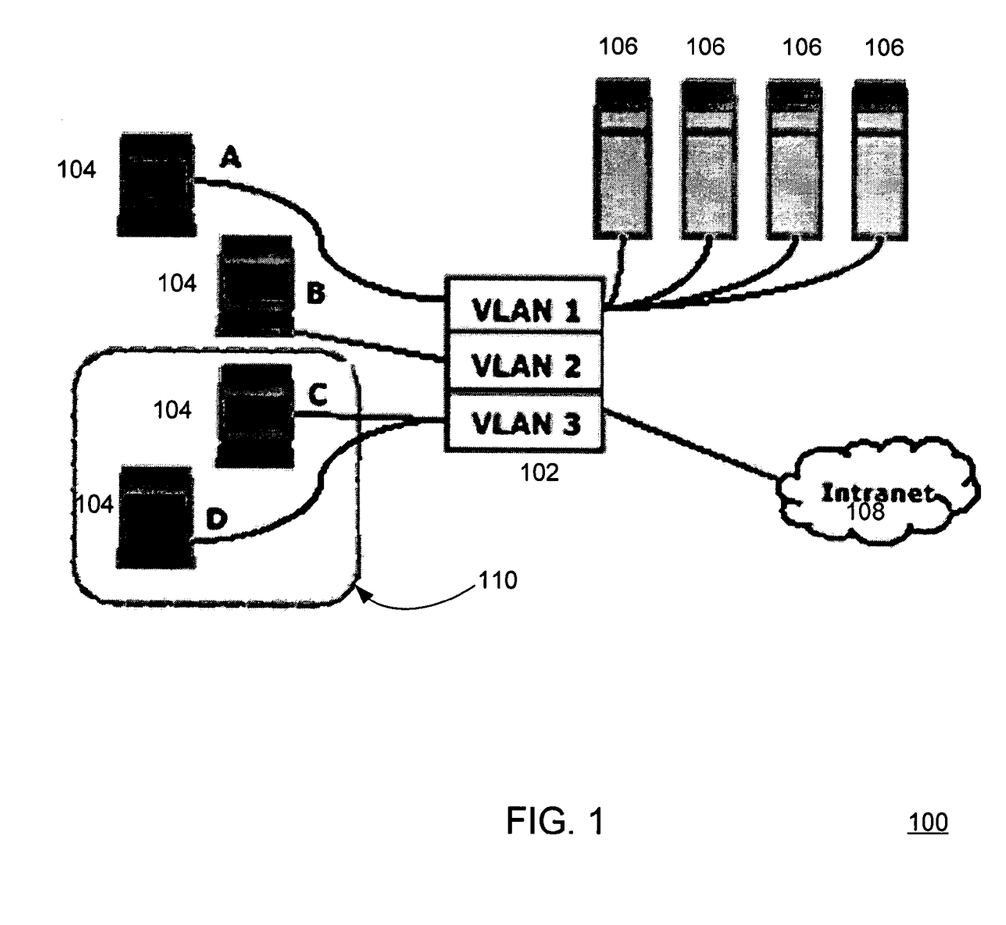
FIG. 1 is a schematic diagram depicting an example system using conventional virus throttling technology.

FIG. 1 is a schematic diagram depicting an example system 100 using conventional virus throttling technology. The system 100 includes a network switch apparatus 102. The switch apparatus 102 may comprise, for example, a ProCurve® Switch 5300xl available from the Hewlett Packard Company. Connected to various ports of the switch apparatus 102 are, for example, host devices 104 and networked servers 106. The switch apparatus 102 may also be connected via a port to an Intranet 108. Other networks and network devices may also be connected to the switch apparatus 102.

The switch apparatus 102 is configured with Internet Protocol routing capabilities. The switch apparatus 102 is also configured to handle multiple virtual local area networks (VLANs). In the illustration, three VLANs are shown. In the example network, the ports configured to be on VLAN1 connect to host A and to the networked servers. A port configured to be on VLAN2 connects to host B. Finally, ports configured to be members of VLAN3 connect to hosts C and D and to the Intranet.

The switch apparatus 102 performs virus throttling (connection-rate filtering) by intercepting IP-routed connection requests, that is, connections crossing VLAN boundaries, in which the source subnet and destination subnet are different. Such IP-routed connection requests include, for example, TCP connections, UDP packets, SMTP requests, HTTP requests, and connection requests of most other common session and application protocols.

For example, if the devices on VLAN3 are infected with malicious code, such as a virus or worm, then the virus throttling feature of the switch apparatus 102 may protect the devices on VLAN1 and VLAN2 from high connection rate traffic that is being routed from the infected VLAN3. Such high connection rate traffic is characteristic of attacks from viruses and other malicious code.

The above-discussed configuration requires that all new source/destination traffic streams be programmed into a route table. The route table provides a "working set" of recent connections from each source and may be used to determine the number of unique connections that a given source has been trying to make in a recent time period. Hence, the above-discussed configuration may provide connection-rate filtering, but it generally requires that the switch have networking layer 3 routing enabled.

Figure 2:
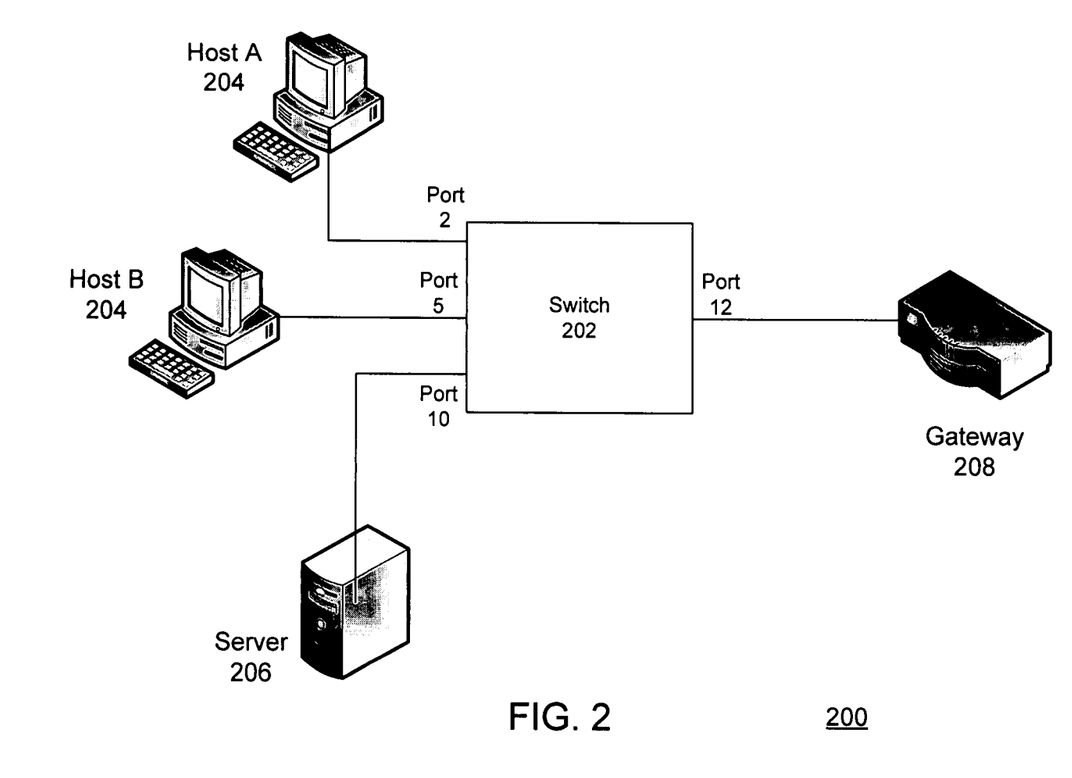
FIG. 2 is a schematic diagram depicting an example system in which connection-rate filtering may be implemented in accordance with an embodiment of the invention.

FIG. 2 is a schematic diagram depicting an example system in which connection-rate filtering may be implemented in accordance with an embodiment of the invention. In this example, the switching apparatus 202 is depicted as being connected via port 2 to Host A 204, via port 5 to Host B 204, via port 10 to Server 206, and via port 12 to Gateway 208. Consider, in this example, that Hosts A and B 204 and the Server 206 are on a same subnet and that traffic outside of the subnet is sent to the MAC address of the gateway 208.

Here, the switching apparatus 202 does not necessarily need to have layer 3 routing nor virtual local area networking enabled in order to provide connection-rate filtering. As discussed further below in relation to FIGS. 3 through 5, the switching apparatus 202 may be configured so as to provide connection-based filtering in a way that does not depend upon new traffic streams being programmed into a route table.

Figure 3:
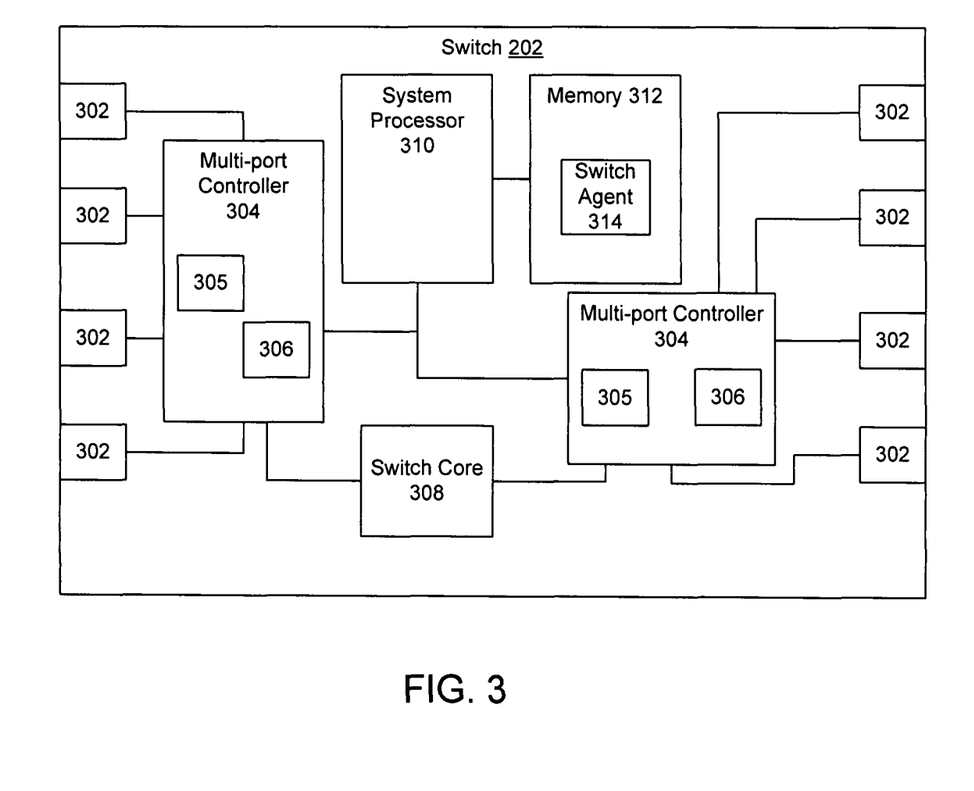
FIG. 3 is a schematic diagram of a switching apparatus configured with connection-rate filtering in accordance with an embodiment of the invention.

FIG. 3 is a schematic diagram of a switching apparatus 202 configured with connection-rate filtering in accordance with an embodiment of the invention. The switching apparatus 202 may be configured with multiple ports 302. The ports 302 may be controlled by one or more controller ASICs (application specific integrated circuits) 304. The controller ASICs 304 may include metering circuitry 305 and sampling circuitry 306.

The apparatus 202 may transfer (i.e. "switch") packets between ports by way of a conventional switch core 308 which interconnects the ports. A system processor 310 and memory 312 may be used to control the apparatus 202. For example, a switch agent 314 may be implemented as code in memory 312 which is being executed by the system processor 310 of the switch 202.

Figure 4:
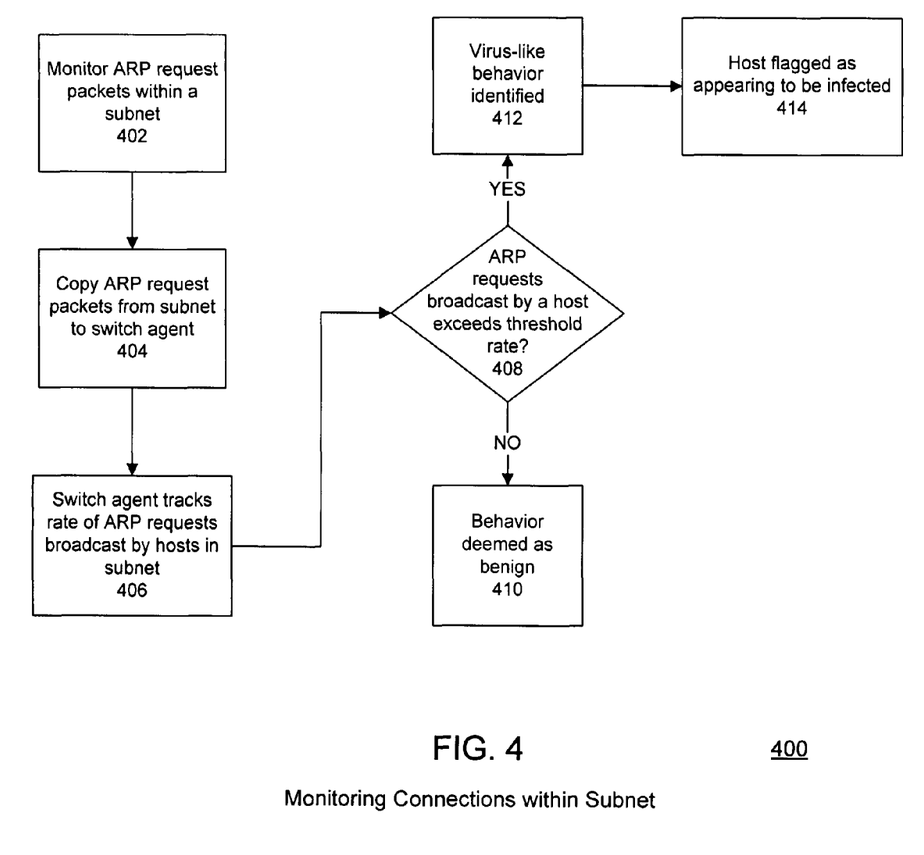
FIG. 4 is a flow chart depicting a method for filtering connections within a subnet in accordance with an embodiment of the invention.

FIG. 4 is a flow chart depicting a method 400 for filtering connections within a subnet in accordance with an embodiment of the invention. The method 400 filters connections within a subnet by monitoring address resolution protocol (ARP) requests. Advantageously, by monitoring ARP requests, maintaining a working set of recent source/destination connection requests becomes unnecessary and may be avoided.

Address resolution protocol (ARP) is utilized to look-up layer 2 (MAC) addresses based on layer 3 (IP) addresses. In other words, ARP is used to translate an IP address to a MAC address. For example, a destination IP address for an outgoing IP packet may be known by a network application, but the corresponding destination MAC address may need to be determined. The translation is done for outgoing IP packets and is generally performed with a look-up to an ARP table.

When the ARP table is unable to translate a destination IP address, an ARP request packet is generally sent to each device on the network using a broadcast MAC address. An ARP module at each device examines the IP address in the ARP request and determines if the IP address in the request matches the device's IP address. The device with the matching IP address sends an ARP response packet back to the device which sent the ARP request.

A switching apparatus (such as switch 202) may be configured to monitor 402 ARP request packets within an Internet protocol (IP) subnet. A subnet is a logical grouping of connected network devices. An IP subnet includes nodes which share a contiguous range of IP address numbers. For example, the switch 202 configured in FIG. 2 may monitor ARP requests on an IP subnet which may include the various devices (hosts 204, servers 206, and other devices) shown as connected to the switch 202. In a practical application of this method 400, the subnet being monitored 402 would likely include many more network devices than shown in FIG. 2. For example, a large subnet may include several hundred network devices.

The monitoring of ARP requests may be performed, for example, by sampling circuitry 306 in the switch apparatus 202. The sampling circuitry 306 may be configured to copy ARP request packets to a switch agent 314.

The switch agent 314 may be configured to track 406 a rate of ARP requests being broadcast by any particular host in the subnet. A comparison 408 is made between the rate of ARP requests broadcast by any particular host and a pre-set threshold rate. If it is determined that the rate of ARP requests broadcast by the source hosts in the subnet do not exceed the threshold rate, then the "behavior" of the source hosts in the subnet may be deemed 410 as benign (not suspected as being malicious).

On the other hand, if it is determined 408 that the rate of ARP requests sent by a particular source host exceeds the threshold rate, then the "behavior" of the source host may be identified 412 as exhibiting virus-like (suspicious) behavior. Hence, that suspiciously behaving host (i.e. the source address) may be flagged 414 by the switch agent 314 as appearing to be infected by malicious code.

Further methodology or action 416 may be applied once a host is flagged as potentially infected. For example, a notification may be sent indicating that a specific source is exhibiting potentially malicious behavior, and/or traffic from the specific source may be blocked by the connection-rate filtering apparatus.

In one implementation, the blocking of traffic may be for a temporary period of time to slow down spreading of malicious code. In another implementation, the blocking of traffic may continue until a command is received from a user to unblock traffic from the specific source.

The above-discussed technique utilizes ARP requests to provide an elegant way of identifying a number of unique destination hosts that a given host tries to connect with on a subnet. If a host wishes to connect with a large number of devices on a subnet, it will broadcast many ARP requests to resolve the MAC addresses. Copying up the ARP requests to the switch agent enables the switch agent to detect whether a host is attempting to connect with a large number of other hosts in a short period of time. Such attempts are indicative of a host that is potentially infected with a virus or other malicious code. In other words, this technique provides a way of identifying a host exhibiting suspicious behavior by detecting whether a host sends an excessive amount of ARP requests to different hosts within a short amount of time.

Figure 5:
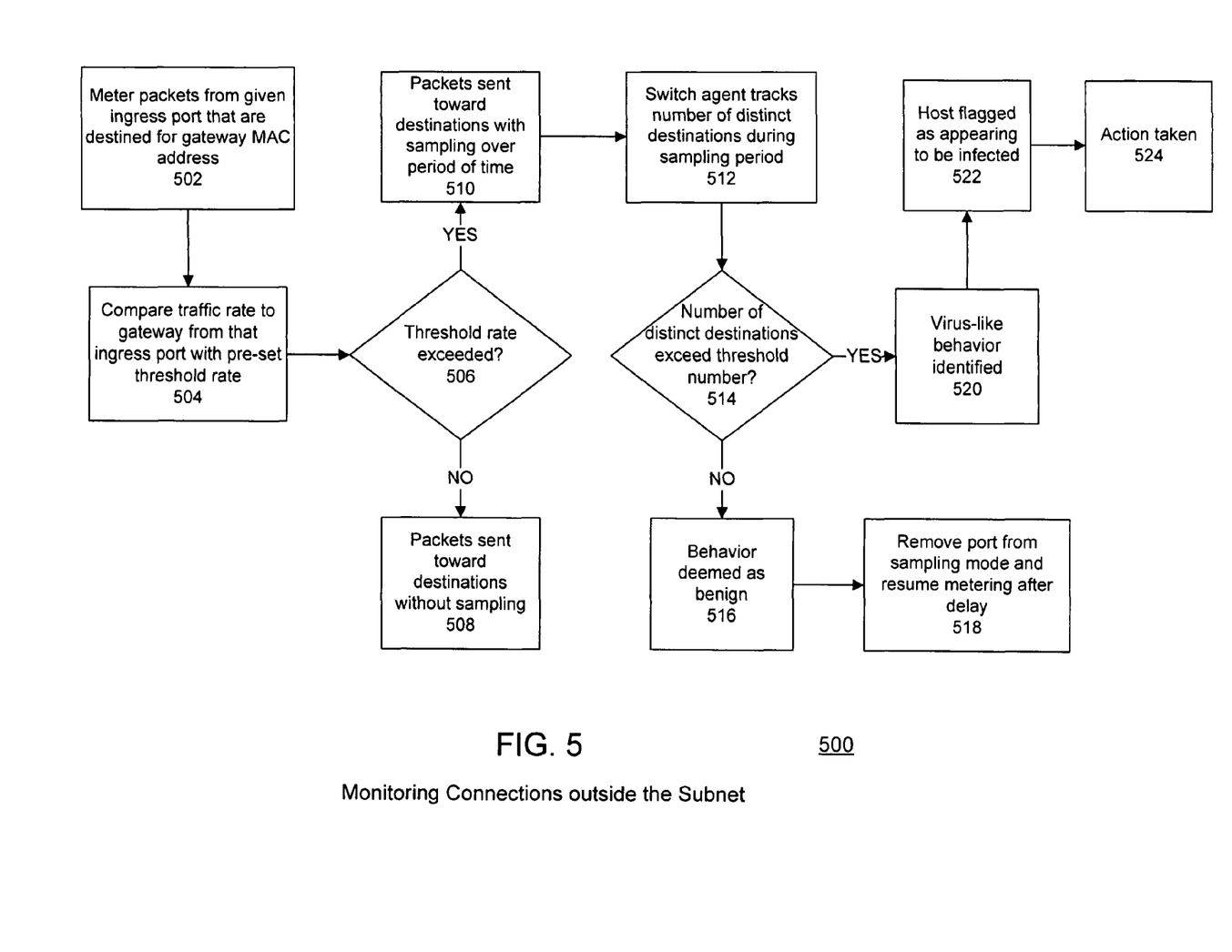
FIG. 5 is a flow chart depicting a method for filtering connections to addresses outside of a subnet in accordance with an embodiment of the invention.

FIG. 5 is a flow chart depicting a method 500 for filtering connections to addresses outside of a subnet in accordance with an embodiment of the invention. A switching apparatus (such as switch 202) may be configured to meter 502 packets from a given ingress port 302 that are destined for a gateway MAC address.

For example, the switch 202 configured in FIG. 2 may measure the rate of packets coming in on port number 2 (which is connected to Host A 204) which are destined for the gateway MAC address via port 12. The metering 502 may be performed, for example, by metering circuitry 305 within a multi-port controller 304 connected to the egress port 302 leading to the gateway.

The measured traffic rate may then be compared 504 against a pre-set threshold rate. The threshold rate may be configurable by a network administrator or other user. The comparison may be performed, for example, by circuitry and/or code within the controller 304. If it is determined 506 that the threshold rate is not exceeded, then the packets may be sent 508 towards their destinations without sampling (as would normally be done without connection-rate metering). The packets may be sent 508 to their destinations, for example, by way of a conventional switch core 308 which interconnects the ports.

Otherwise, if it is determined 506 that the threshold rate is exceeded, then the packets may be sent 510 towards their destinations via the gateway, but with sampling over a period of time. For example, the sampling period (i.e. the period during which the port is set in sampling mode) may be in a range of ten to fifteen seconds. The sampling 510 may be performed, for example, by sampling circuitry 306 within the controller 304. The sampling 510 may be performed, for example, by forwarding every nth (for example, every tenth) packet up to a switch agent 314.

The switch agent 314 may be configured to track or count 512 the number of distinct destinations for the sampled host communications received during the sampling period. Although only a portion of the traffic of interest is sampled, the sampled traffic may be taken as representative of the traffic of interest.

If it is determined 514 that the number of distinct destinations in the sampled traffic from each source host does not exceed the threshold number, then the "behavior" of the source hosts may be deemed 516 as benign (not suspected as being malicious). Thereafter, the port may be removed 518 from sampling mode and metering may be resumed after a pre-set delay. The pre-set delay may be, for example, for a few minutes. The pre-set delay advantageously allows the benign behavior to play itself out such that unnecessary repeated sampling may be avoided.

On the other hand, if it is determined 514 that the number of distinct destinations in the sampled traffic from a source host does exceed the threshold number, then the "behavior" of the source host may be identified 520 as exhibiting virus-like (suspicious) behavior. Hence, that suspiciously behaving host (i.e. the source address) may be flagged 522 by the switch agent 314 as appearing to be infected by malicious code.

Further methodology or action 524 may be applied once a host is flagged as potentially infected. For example, a notification may be sent indicating that a specific source is exhibiting potentially malicious behavior, and/or traffic from the specific source may be blocked by the connection-rate filtering apparatus.

In one implementation, the blocking of traffic may be for a temporary period of time to slow down spreading of malicious code. In another implementation, the blocking of traffic may continue until a command is received from a user to unblock traffic from the specific source.

In one embodiment, to specifically protect against TCP-based viruses attacking a network, the meter applied in hardware may be used to filter traffic which is destined for the gateway MAC address and which also has the TCP SYN flag set. The SYN flag is typically only set when initiating TCP connections.

Advantageously, the above-described connection-rate filtering solution does not require routing to be enabled on the switching apparatus. The above-described solution may be performed in switching apparatus that have ARP and metering/sampling capabilities.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of connection-rate filtering within a sub-network by a network device, the method comprising:
   measuring, via the circuitry at a controller, a traffic rate of packets from an ingress port that are destined for a gateway address outside the sub-network;
   comparing, via the circuitry at the controller, the measured traffic rate with a first threshold rate;
   sampling, via the circuitry at the controller, packets from the ingress port that are destined for the gateway address outside the sub-network over a period of time if the first threshold rate is exceeded by the measured traffic rate; and
   analyzing, via the circuitry at the controller, the sampled packets; the method further comprising:
   monitoring address resolution protocol (ARP) request packets received from a sub-network by a network device;
   sending a copy of the received ARP request packets to an agent program in the sub-network;
   determining by the agent program a rate of ARP request packets sent by a host in the sub-network; and
   identifying the host as being potentially infected with malicious code based on the determined rate of ARP request packets.

2. The method of claim 1, further comprising:
   comparing the rate of ARP request packets sent by the host in the sub-network with a second threshold rate.

3. The method of claim 2, further comprising:
   identifying the host as being potentially infected with malicious code if the rate of ARP request packets sent by the host exceeds the second threshold rate.

4. The method of claim 3, further comprising:
   sending a notification indicating that the host is potentially infected with malicious code if the second threshold rate is exceeded.

5. The method of claim 3, further comprising:
   blocking traffic from the host if the second threshold rate is exceeded.

6. The method of claim 1, wherein the network device comprises a switching device.

7. The method of claim 1, wherein said analyzing comprises counting a number of distinct destinations for each source host in the sampled packets.

8. The method of claim 7, further comprising determining if a threshold number of distinct destinations is exceeded by the number of distinct destinations from each source host.

9. The method of claim 8, further comprising identifying potentially malicious behavior by a specific source host if the threshold number is exceeded for the specific source host.

10. The method of claim 8, further comprising sending a notification indicating that a specific source host is possibly infected with malicious code if the threshold number is exceeded for the specific source host.

11. The method of claim 8, further comprising blocking traffic from a specific source host if the threshold number is exceeded for the specific source host.

12. A network device on a sub-network configured with connection rate filtering, the device comprising:
   a plurality of ports;
   sampling circuitry;
   metering circuitry configured to measure a traffic rate on a port, wherein the sampling circuitry is configured to sample packets from the port if the traffic rate from the port to a gateway address exceeds a pre-determined threshold rate; and an agent program configured to be executed by a system processor on a sub-network; and the sampling circuitry further configured to send a copy of ARP request packets received by the network device from the sub-network to the agent program, wherein the agent program is further configured to determine a rate of ARP request packets broadcast by a host in the sub-network based on the received copies of the ARP request packets, and identify the host as being potentially infected with malicious code based on the determined rate of ARP request packets.

13. The device of claim 12, wherein the agent program is further configured to compare the rate of ARP request packets broadcast by the host in the sub-network with a first threshold rate.

14. The device of claim 13, wherein the agent program is further configured to identify the host as being potentially infected with malicious code if the rate of ARP request packets broadcast by the host exceeds the first threshold rate.

15. The device of claim 12, wherein the program agent is further configured to receive the sampled packets and to determine a number of distinct destinations for each source in the sampled packets.

16. The device of claim 15, wherein the program agent is further configured to determine if a threshold number of distinct destinations is exceeded by the number of distinct destinations from each source host and to identify potentially malicious behavior by a specific source host if the threshold number is exceeded for the specific source host.

* * * * *